US007982358B2

(12) United States Patent
York et al.

(10) Patent No.: US 7,982,358 B2
(45) Date of Patent: Jul. 19, 2011

(54) HIGH EFFICIENCY ALTERNATOR BOBBIN

(75) Inventors: Michael T. York, Chelsea, MI (US); Anthony Militello, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 2414 days.

(21) Appl. No.: 10/057,061

(22) Filed: Jan. 24, 2002

(65) Prior Publication Data
US 2011/0115330 A1  May 19, 2011

(51) Int. Cl.
H02K 1/22 (2006.01)
(52) U.S. Cl. .................. 310/263; 310/194
(58) Field of Classification Search .......... 310/194, 310/263, 270–271
See application file for complete search history.

(56) References Cited

U.S. PATENT DOCUMENTS

| | | | |
|---|---|---|---|
| 3,215,877 A | 11/1965 | Raver et al. | |
| 3,305,740 A | 2/1967 | Shano | |
| 4,114,056 A * | 9/1978 | Nimura | 310/71 |
| 4,307,314 A * | 12/1981 | Yamada et al. | 310/263 |
| 4,902,922 A | 2/1990 | Annovazzi | |
| 5,270,604 A * | 12/1993 | Sandel et al. | 310/263 |
| 5,325,003 A * | 6/1994 | Saval et al. | 310/43 |
| 5,539,265 A | 7/1996 | Harris et al. | |
| 5,945,765 A | 8/1999 | Chen | |
| 5,973,423 A | 10/1999 | Hazelton et al. | |
| 6,037,694 A * | 3/2000 | Asao et al. | 310/216.116 |
| 6,107,719 A | 8/2000 | Asao | |

FOREIGN PATENT DOCUMENTS

FR 2616280 9/1988
GB 2294160 A 4/1996

* cited by examiner

Primary Examiner — Thanh Lam
(74) Attorney, Agent, or Firm — Brinks Hofer Gilson & Lione

(57) ABSTRACT

A rotor assembly is disclosed for use with an alternator. The rotor assembly includes a bobbin assembly, a claw pole assembly having an integrated hub on which the bobbin assembly is positioned, a shaft that is received in the claw pole assembly, and a slipring assembly connected to the shaft. The bobbin assembly includes thin first and second end caps, a metal sleeve, a ring of inner tape, a field coil, and a ring of outer tape. The first and second end caps each have inner and outer flaps. The inner flaps are folded inwardly so that the end caps fit over the metal sleeve. The ring of inner tape is wrapped around the inner flaps of both end caps to adhere the first and second end caps to the metal sleeve. The field coil is wrapped around the inner ring of tape, inner end caps, and metal sleeve. The outer flaps on the end caps are inwardly folded around the field coil. The ring of outer tape is adhered to the folded outer flaps and the field coil. The claw pole assembly includes a front claw pole section and a rear claw pole section.

21 Claims, 10 Drawing Sheets

HIGH EFFICIENCY ALTERNATOR BOBBIN

FIELD OF INVENTION

The invention relates to an automotive electrical alternator, and particularly to an alternator having a highly efficient bobbin.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems, increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

It is well known that claw pole style rotors are used almost exclusively in automotive alternators. A standard claw-pole rotor consists of two iron claw pole pieces, an insulating bobbin supporting a wound field coil, a shaft, and a slipring assembly.

The excitation winding consists of a continuous insulated copper wire wrapped around the bobbin. Each claw-pole piece includes a hub portion that is inserted inside the inner diameter of the bobbin. The hub portion of each pole piece has a face area that contacts the opposite hub face area forming a continuous iron magnetic circuit within the bobbin inside diameter.

A knurled shaft is inserted into a bore formed by the assembly of the pole pieces, locking the poles onto the shaft. The pole assembly may contain two or three components. The slipring assembly is also pressed onto a smaller knurled diameter of the shaft. A start and end wire of the field coil are directed across the back of the rear pole piece and up slots in the shaft. The start and end wire are electrically connected to copper shells of the slipring assembly. This allows the electrical brushes mounted onto the machine to pass current through the slipring assembly and field coil while the rotor is rotating with respect to the rest of the machine.

It is also well known that the power density and the efficiency of the alternator can be improved if the percentage of copper fill within the rotor field coil can be increased without saturating the steel magnetic circuit. The more field coil revolutions that can be positioned inside the rotor, the higher the magnetic flux resulting in a higher output for the alternator. Currently, a standard conventional rotor contains an area for the field coil made up by opposing claw-pole pieces. The available area is occupied by the bobbin and field coil. Known designs use approximately 16% of the field coil allowable area for the bobbin. The rest of the area is available for the field coil copper wires.

Generally, bobbins on the market today have a wall thickness of approximately 0.5-0.9 millimeters (mm) thick. Most currently used bobbins are injection molded using nylon 6-6. It is not desirable to manufacture bobbins with a wall thickness of less than 0.5 mm.

Another existing prior art design and process to manufacture alternator bobbins is by stamping the end caps out of a paper or polymer sheet. The bobbin end caps are assembled onto a hub that is a separate piece from the two claw-poles. The hub provides structural rigidity for the inside diameter of the bobbin allowing it to be wound on a wire winder and removed from the winder without the wire tension collapsing the bobbin.

There are two key disadvantages in this design. First, it requires that the hub for the claw-poles be a separate piece from the claw-poles. In this design, the bobbin end caps must be assembled to the hub and fixed in place, often by taping them in place. Then, the field coil wire is wound on the bobbin supported by the hub. Second, stamped end caps are relatively thick to help retain the field wires in position and prevent the winding from flexing the end caps outward once it is removed from the wire winder's support tooling.

There are several reasons why it is not desirable to have a hub that is a separate component from the pole pieces. First, it is more expensive to manufacture since the hub is not made as part of the poles in a fully finished forged part. Rather, the poles are forged separately and the hub is cold headed and machined to final form. Second, it creates an extra interface between the ends of the hub and the pole faces. This reduces the magnetic field conducted through the poles and reduces the power output of the machine. On the other hand, poles that have integrated hubs only have one interface where the pole hub faces meet when assembled. Third, the structural rigidity of each pole is reduced. During high revolution per minute (RPM) operation, the fingers of the poles tend to flex outwardly due to centrifugal force. With the hub removed, the base strength of the poles is reduced leading to a reduction in high RPM capability and increased noise due to vibration.

Further, there are several reasons why it is desirable to decrease the thickness of the stamped end caps. First, the thicker the end caps are, the less field wire fill that is able to fit in the rotor since more space is occupied by the end caps. This reduces the power output of the alternator due to reduced power density and reduces the efficiency of the alternator.

Second, heat transfer through the bobbin end caps from the coil to the poles is reduced leading to the field coil operating at a high temperature. This also contributes to reduction in efficiency, power density, and useful life of the alternator.

SUMMARY OF THE INVENTION

This invention provides an improved alternator bobbin design that increases the field wire fill percent within the rotor and improves heat transfer from the field coil to the claw-pole pieces. The assembly of the present invention provides increased field coil area due to a substantial reduction in bobbin thickness. There is also a dramatically reduced thermal resistance between the field coil and the claw-pole pieces due to a very thin bobbin. A decreased thermal resistance means that the heat is more readily dissipated through the bobbin thickness to the claw-pole pieces. This assembly can be used with poles having integrated hubs. Further disclosed is a new method of applying tension to the wires to prevent them from rotating relative to the bobbin or poles.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
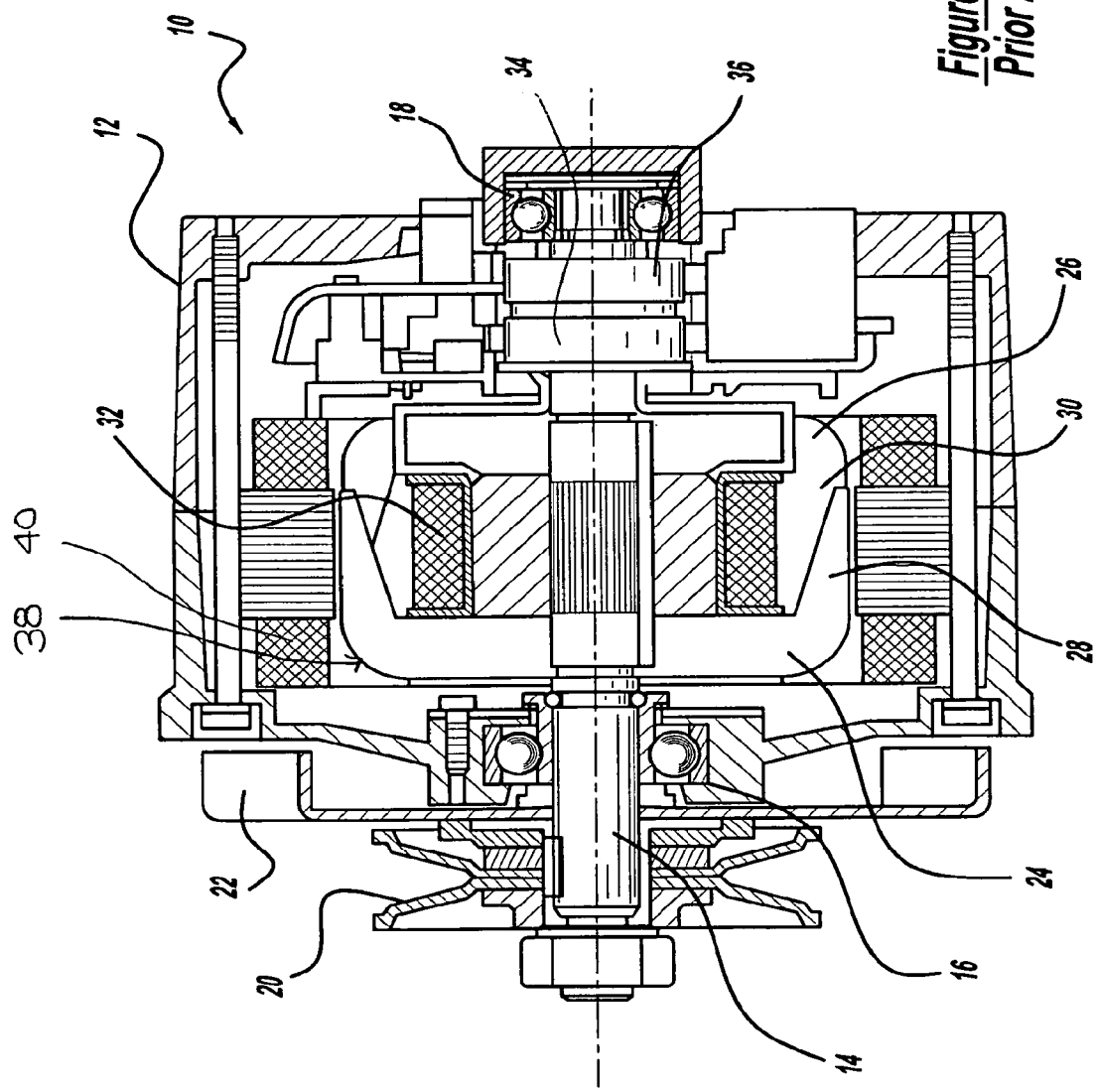
FIG. 1 is a cross sectional view of a typical prior art electrical alternator.

In order to provide a framework for a further detailed description of the preferred embodiments of this invention, FIG. 1 is presented illustrating a prior art electrical alternator configuration. That figure illustrates electrical alternator 10 enclosed with housing 12. Alternator rotor shaft 14 is supported by rolling element bearings 16 and 18. Belt driven pulley 20 is fastened to the protruding front end of rotor shaft 14. Fan 22 rotates with shaft 14 and provides cooling airflow for removing heat from alternator 10. Front and rear alternator poles 24 and 26, respectively, rotate with shaft 14 and have extending claw fingers 28 and 30, respectively. Fingers 28 and 30 interlace to create the well known "claw pole" rotor configuration. Excitation winding 32 is carried within the cavity formed between poles 24 and 26. A DC excitation signal is applied to excitation winding 32 through a pair of slip rings 34 and 36, and associated brushes.

Rotor assembly 38 which includes poles 24 and 26, winding 32, and slip rings 34 and 36, produces an alternating polarity magnetic field by rotation of the rotor assembly. Although a DC excitation signal is applied to slip rings 34 and 36, the interlacing of alternating poles 24 and 26 creates an alternating polarity magnetic field as presented to the windings of stationary core 40 located radially around rotor assembly 38. The movement of the alternating polarity magnetic field presented by rotor assembly 38 across the windings of core 40 generates electricity in a well-known manner.

Electrical energy output by electrical alternator 10 generated within core 40 is directed to rectifying diodes (not shown) and perhaps further filtering and power conditioning devices before being connected with the vehicle's electric distribution bus. Sophisticated control systems, also known as voltage regulators, are used to apply an appropriate level of DC voltage to excitation windings 32 to generate the desired RMS value of the outputted alternating current from alternator 10, which can be in single phase or multi-phase form, depending on the winding design of core 40.

Figure 2:
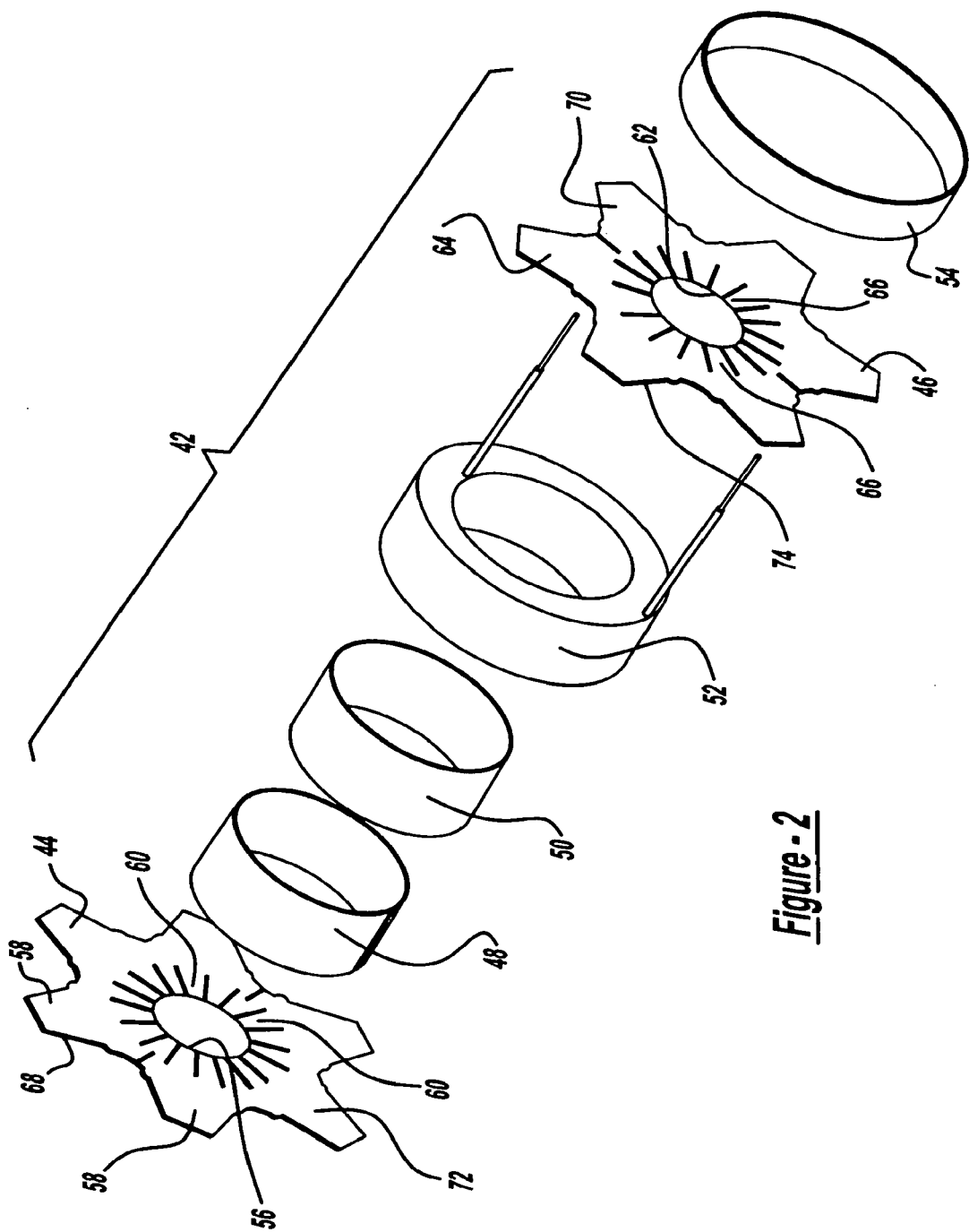
FIG. 2 is an exploded perspective view of the bobbin assembly of the present invention.

As shown in FIG. 2, the bobbin assembly, shown generally at 42, includes a first end cap 44, a second end cap 46, a rigid sleeve 48, a ring of inner tape 50, an excitation winding 52, and a ring of outer tape 54. Preferably, the end caps 44, 46 are stamped. They could be stamped from a thin sheet of polymer, a composite, a cloth sheet of material, or a laminated material like NOMEX™MYLAR™ laminate.

The rigid sleeve 48 is preferably metal and is constructed by rolling a cylinder from a flat rectangular sheet of metal. Preferably the metal is steel. Preferably the thickness of the wall is between 0.1-1.0 mm, but most preferably in the range of 0.20-0.30 mm.

The first end cap 44 is generally star shaped and has a centered generally circular aperture 56. The first end cap 44 has outer flaps 58 positioned around the outer periphery and inner flaps 60 positioned around the inner periphery. Similarly, the second end cap 46 is generally star shaped and has a generally circular aperture 62. The second end cap 46 also has outer flaps 64 positioned around the outer periphery and inner flaps 66 positioned around the inner periphery.

Further, the first and second end caps 44, 46 each have an outward facing side 68, 70 and an inward facing side 72, 74. The inner flaps 60, 66 on both the first and second end caps 44, 46 are folded inward to fit over the metal sleeve 48. In other words, the inner flaps 60, 66 are folded at a generally 90° angle from the inward facing side 72, 74 on both the first and second end caps 44, 46.

Figure 3:
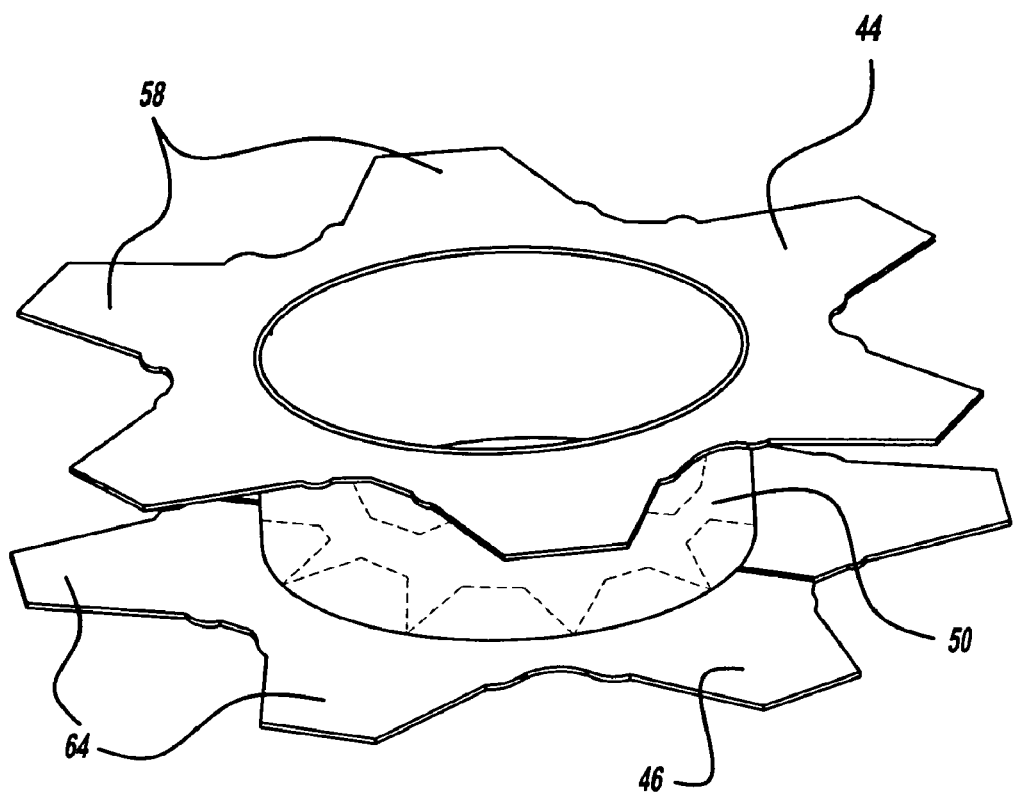
FIG. 3 is a perspective view of the assembled bobbin.
Figure 4:
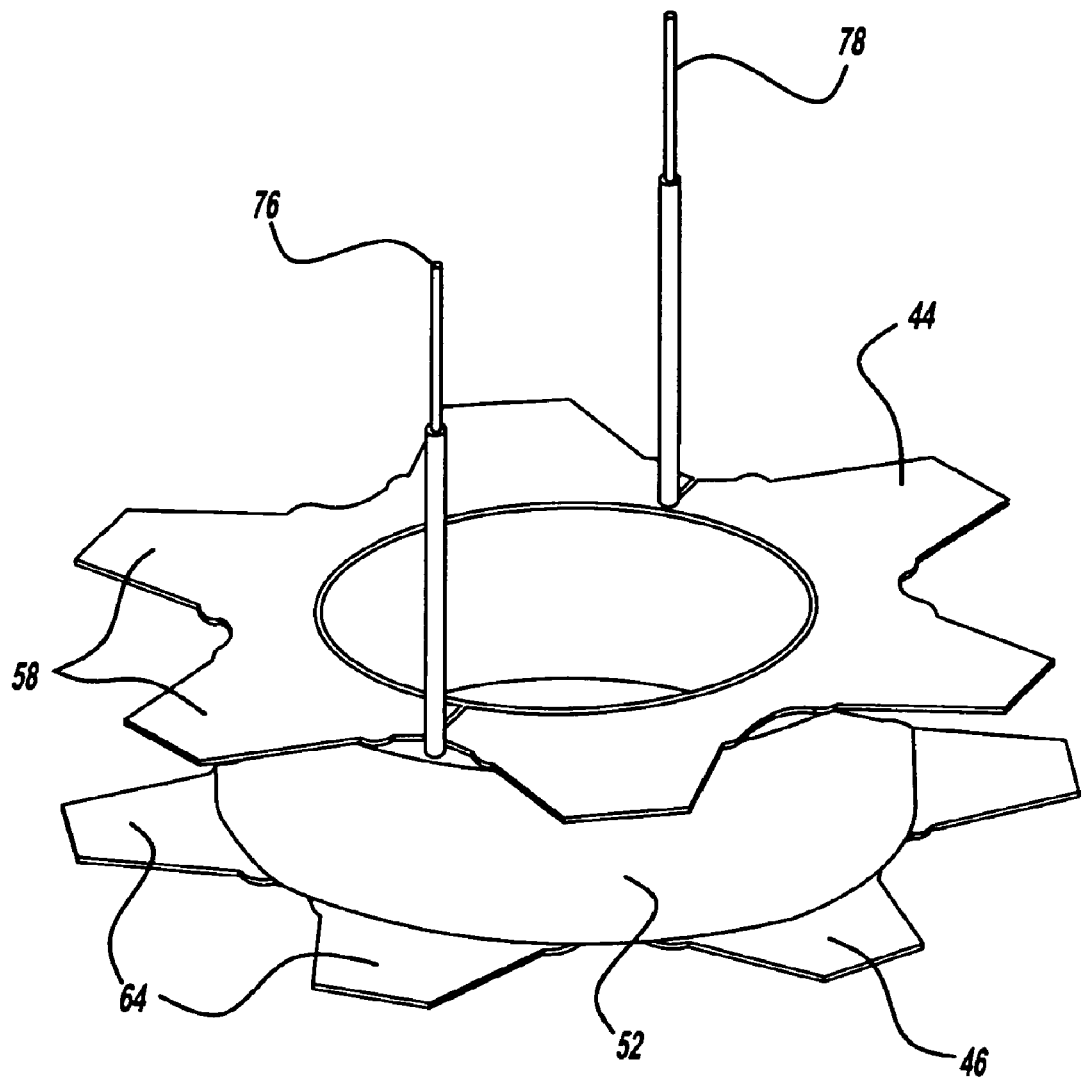
FIG. 4 is a perspective view of the excitation winding mounted onto the bobbin.

As shown in FIG. 3, once the inner flaps 60, 66 of the first and second end caps 44, 46 are positioned over the metal sleeve 48 a ring of inner tape 50 may be placed around the inner flaps 60, 66 to adhere the inner flaps 60, 66 to the metal sleeve 48. Numerous methods may be used to adhere the inner flaps to the metal sleeve, including but not limited to, using an adhesive. As shown in FIG. 4, the excitation winding 52 is preferably a continuous copper wire that is insulated. The excitation winding 52 is positioned around the metal sleeve 48, first end cap inner flaps 60, second end cap inner flaps 66 and ring of inner tape 50. The first and second ends 76, 78 of the excitation winding wire 52 are not wound around the metal sleeve 48.

Figure 5:
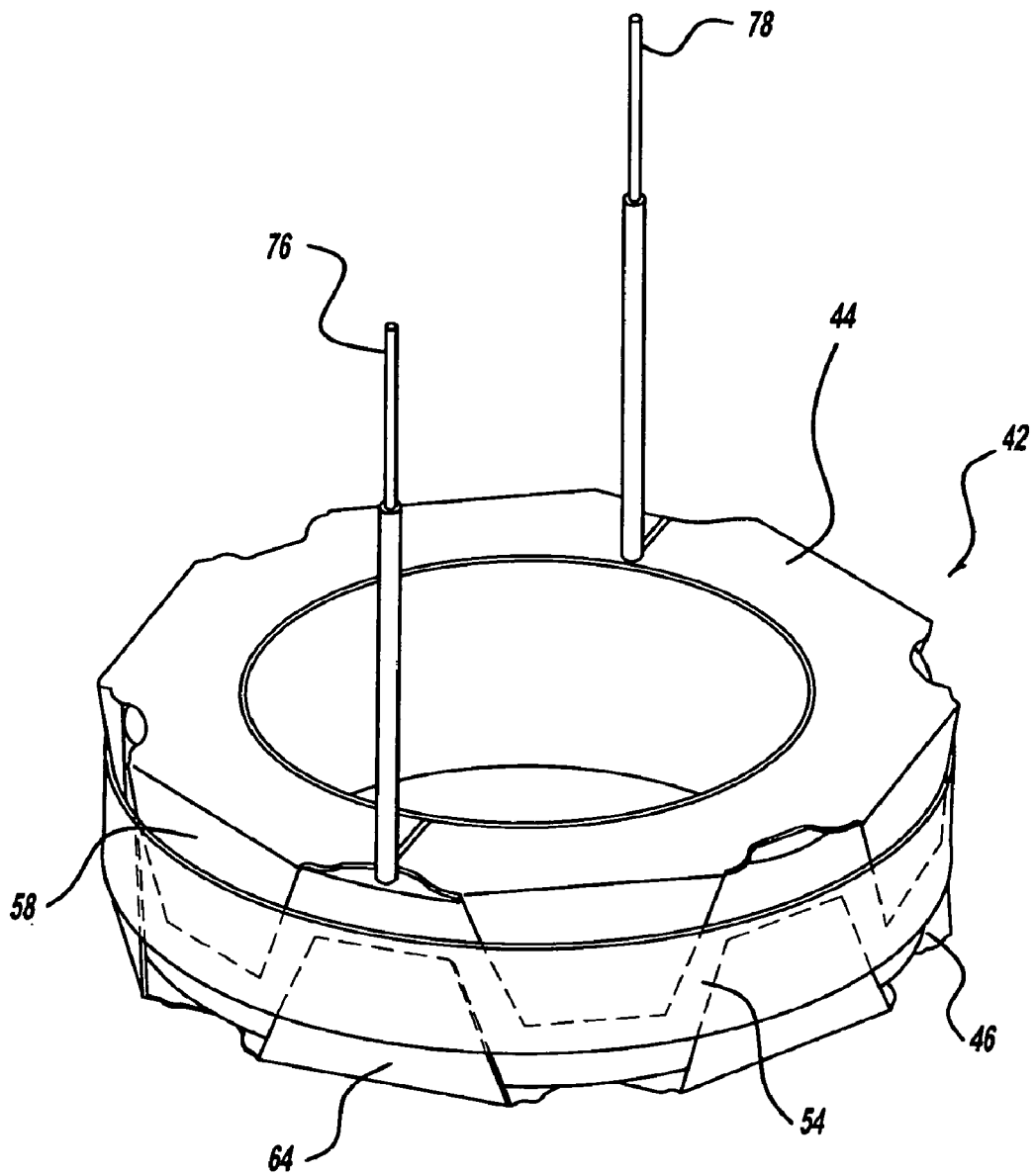
FIG. 5 is a perspective view of the bobbin assembly of the present invention.

As shown in FIG. 5, the outer flaps 58, 64 of both the first end cap 44 and second end cap 46 are inwardly folded around the excitation winding 52. A ring of outer tape 54 may be wrapped around the folded outer flaps 58, 64 of the first and second end caps 44, 46 to secure the outer flaps 58, 64 in ,position around the excitation winding 52.

Figure 6:
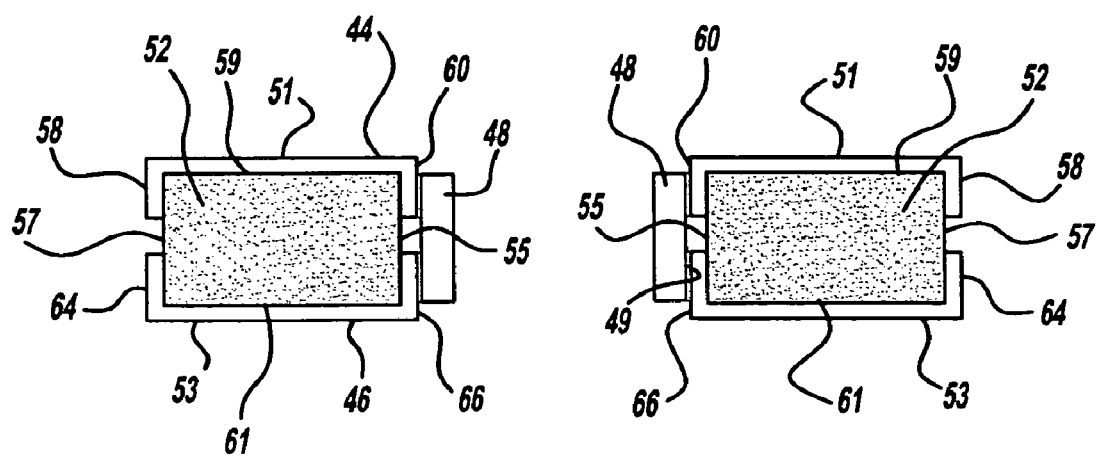
FIG. 6 is a cross sectional view of the bobbin assembly of the present invention.

In other words, as shown in FIG. 6, the annular metal sleeve 48 defines an outside diameter 49. The first end cap 44 is formed from a thin sheet of material and has inner flaps 60, outer flaps 58, and a side wall 51 positioned between the inner flaps 60 and outer flaps 58. The inner flaps 60 are formed inward to fit over the outside diameter 49 of the metal sleeve 48. Similarly, the second end cap 46 is formed from a thin sheet of material and has inner flaps 66, outer flaps 64, and a side wall 53 positioned between the inner flaps 66 and outer flaps 64. The inner flaps 66 are formed inward to fit over the outside diameter 49 of the metal sleeve 48. The annular excitation winding 52 has an inside diameter 55, an outside diameter 57, and opposing side surfaces 59, 61. The inner flaps 60, 66 of the first and second end caps 44, 46 are positioned between the outside diameter of the metal sleeve 49 and the inside diameter 55 of the annular excitation winding 52. The outer flaps 58, 64 of the first and second end caps 44, 46 extend over the outside diameter 57 of the annular excitation winding 52. The side walls 51, 53 of the first and second end caps 44, 46 extend over the opposing side surfaces 59, 61 of the excitation winding 52.

Figure 7:
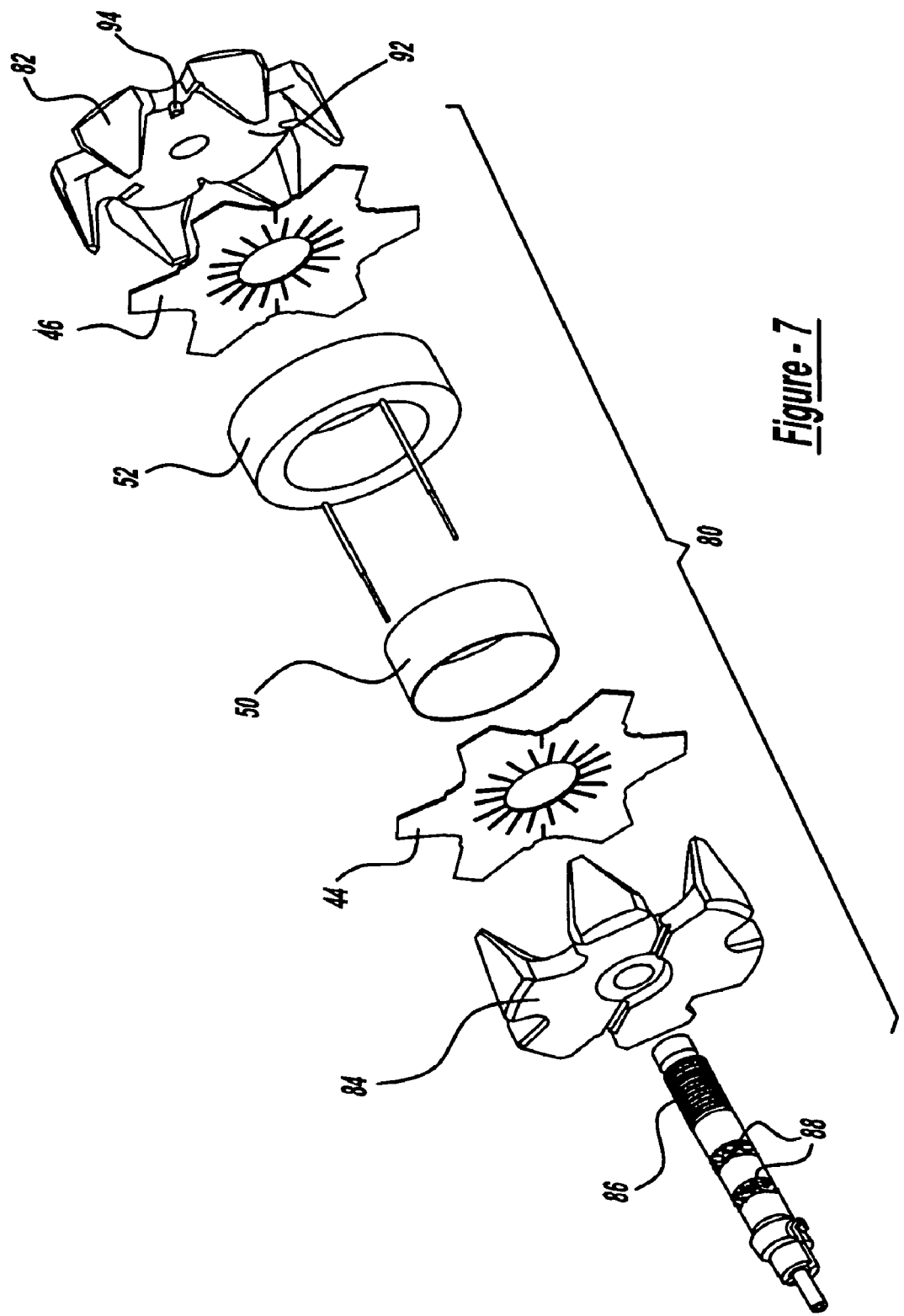
FIG. 7 is an exploded perspective view of the rotor assembly of the present invention.
Figure 8:
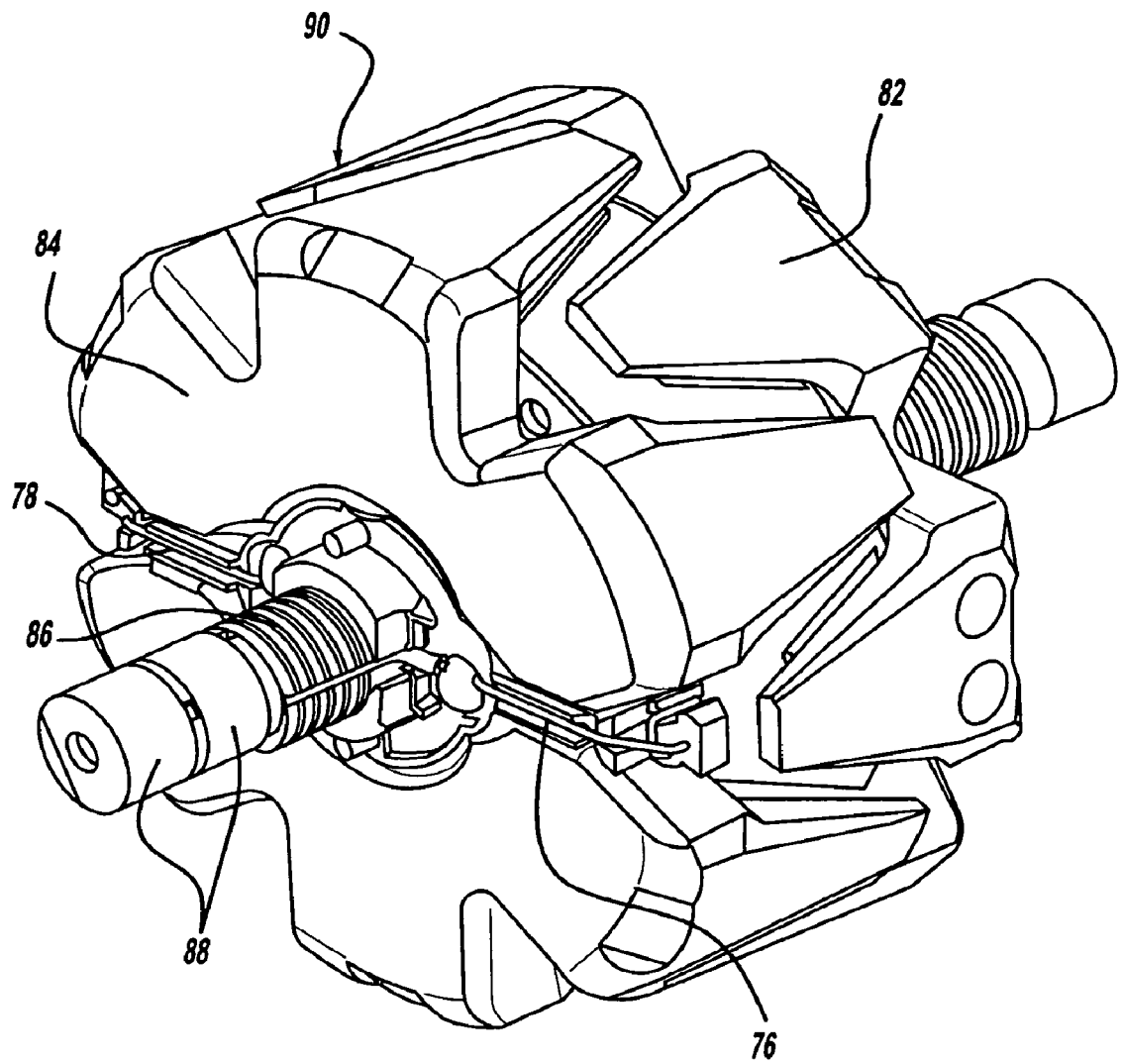
FIG. 8 is a perspective view of the rotor assembly of the present invention.

This bobbin assembly 42 can then be used in a rotor assembly 80 for an electrical machine, such as an automotive alternator. The rotor assembly 80, shown in FIGS. 7 and 8, further includes a front claw pole section 82, a rear claw pole section 84, a shaft 86, and a slipring assembly 88. The front and rear claw pole sections 82, 84 combine to form a claw pole assembly 90. Preferably, the claw pole assembly 90 has an integrated hub 92. Further, the claw pole assembly 90 forms a bore 94 in which the shaft 86 is received. The slipring assembly 88 is attached to the shaft 86.

The first and second ends 76, 78 of the excitation winding 52, or the leads of the field coil, are available for connection to the slipring assembly 88. The leads 76, 78 are routed along the rear claw pole section 84 for connection to the slipring assembly 88.

Figure 9A:
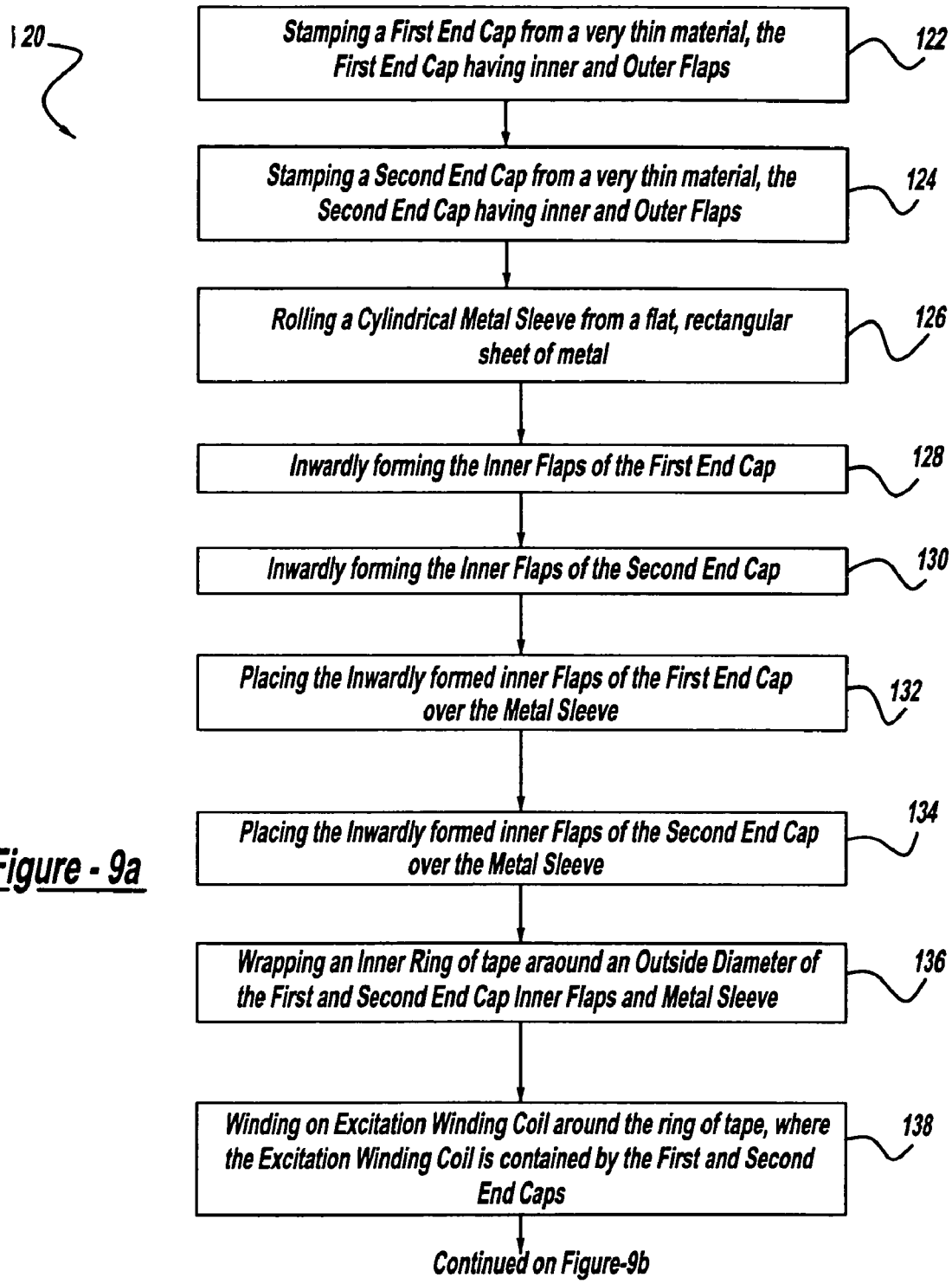
FIG. 9 is a flow chart of the method of the present invention.
Figure 9B:
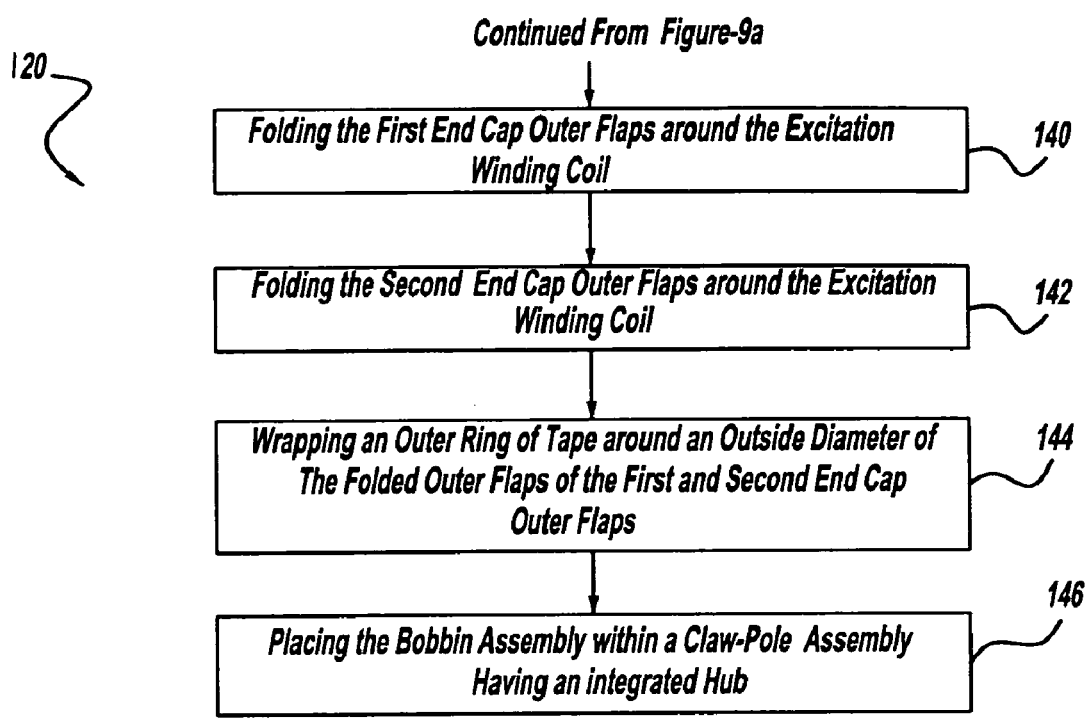

FIG. 9 is a flowchart of the method of the present invention, shown generally at 120. At 122 a first end cap is stamped from a very thin material, the first end cap having inner flaps and outer flaps. At 124 a second end cap is stamped from a very thin material, the second end cap having inner flaps and outer flaps. At 126 a cylindrical metal sleeve is rolled from a flat, rectangular sheet of metal. At 128 the inner flaps of the first end cap are inwardly formed. At 130 the inner flaps of the second end cap are inwardly formed. At 132 the inwardly formed inner flaps of the first end cap are placed over the metal sleeve. At 134 the inwardly formed inner flaps of the second end cap are placed over the metal sleeve. At 136 an inner ring of tape is wrapped around an outside diameter of the first and second end cap inner flaps and metal sleeve. At 138 an excitation winding coil is wound around the ring of tape, where the excitation winding coil is contained by the first and second end caps. At 140 the first end cap outer flaps are folded around the excitation winding coil. At 142 the second end cap outer flaps are folded around the excitation winding coil. At 144 an outer ring of tape is wrapped around an outside diameter of the folded outer flaps of the first and second end cap outer flaps. At 146 the bobbin assembly is placed within a claw-pole assembly that has an integrated hub.

While the above description constitutes the preferred embodiment of the present invention, it will be appreciated that the invention is susceptible to modification, variation and change without departing from the proper scope and fair meaning of the accompanying claims.

We claim:

1. A bobbin assembly for use in an electrical machine, the bobbin comprising:
   an annular rigid sleeve defining an outside diameter;
   a first end cap formed of thin sheet material having inner flaps, outer flaps, and a side wall positioned between the inner flaps and outer flaps, the inner flaps being formed inward to fit over the outside diameter of the rigid sleeve;
   a second end cap formed of thin sheet material having inner flaps, outer flaps, and a side wall positioned between the inner flaps and outer flaps, the inner flaps being formed inward to fit over the outside diameter of the rigid sleeve;
   an annular excitation winding having an inside and an outside diameter and opposing sides surfaces; and
   wherein the inner flaps of the first and second end caps are positioned between the outside diameter of the rigid sleeve and the inside diameter of the annular excitation winding, the outer flaps of the first and second end caps extend over the outside diameter of the annular excitation winding, and the side walls of the first and second end caps extend over the opposing side surfaces of the excitation winding.

2. The bobbin assembly of claim 1 further comprising a ring of inner tape adhering the first end cap inner flaps and second end cap inner flaps to the rigid sleeve.

3. The bobbin assembly of claim 1 further comprising a ring of outer tape wrapped around the folded outer flaps of the first and second end caps and the excitation winding.

4. The bobbin assembly of claim 1 wherein the first end cap is generally star shaped having a centered generally circular aperture, the first end cap having an outer periphery and an inner periphery wherein the outer flaps are positioned around the outer periphery and the inner flaps are positioned around the inner periphery;
   and wherein the second end cap is generally star shaped having a centered generally circular aperture, the second end cap having an outer periphery and an inner periphery wherein the outer flaps are positioned around the outer periphery and the inner flaps are positioned around the inner periphery.

5. The bobbin assembly of claim 4 wherein the first end cap has an outward facing side and an inward facing side, wherein the inner flaps are folded generally 90° from the inward facing side; and wherein the second end cap has an outward facing side and an inward facing side, wherein the inner flaps are folded generally 90° from the inward facing side.

6. The bobbin assembly of claim 1 wherein the bobbin is used in a rotor assembly for an electrical machine, the rotor assembly further comprising a front claw pole section and a rear claw pole section that combine to form a claw pole assembly, wherein a hub is integrated into the claw pole assembly.

7. The rotor assembly of claim 6 further comprising a shaft that is received in a bore formed in the claw pole assembly and a slipring assembly attached to the shaft.

8. The rotor assembly of claim 7 wherein a first end and a second end of the excitation winding are routed along the rear claw pole section and connected to the slipring assembly.

9. The bobbin assembly of claim 1 wherein the first and second end caps are stamped from a thin sheet of polymer.

10. The bobbin assembly of claim 1 wherein the first and second end caps are stamped from a cloth sheet material.

11. The bobbin assembly of claim 1 wherein the first and second end caps are made from a laminated material.

12. The bobbin assembly of claim 1 wherein the first and second end caps are made from a composite material.

13. The bobbin assembly of claim 1 wherein the rigid sleeve is made of metal.

14. The bobbin assembly of claim 13 wherein the metal sleeve is constructed by rolling a cylinder from a flat rectangular sheet of metal.

15. The bobbin assembly of claim 13 wherein the metal sleeve is made from steel.

16. The bobbin assembly of claim 1 wherein the excitation winding is a continuous copper wire that is insulated.

17. A rotor assembly for use with an electrical machine, the rotor comprising:
- a bobbin assembly including
  - a metal sleeve;
  - a first end cap having inner flaps and outer flaps, the inner flaps being formed inwardly to fit over the metal sleeve;
  - a second end cap having inner flaps and outer flaps, the inner flaps being formed inwardly to fit over the metal sleeve;
  - a field coil positioned around the first end cap inner flaps, second end cap inner flaps and metal sleeve, wherein the first end cap outer flaps and second end cap outer flaps are folded around the field coil;
- a claw pole assembly having an integrated hub for receiving the bobbin assembly and forming a bore, the claw pole assembly including a front claw pole section and a rear claw pole section;
- a shaft positioned within the claw pole assembly bore; and
- a slipring assembly connected to the field coil and mounted on the shaft.

18. A method of constructing a bobbin assembly for use in an electrical machine, the method comprising:
- stamping a first end cap from a very thin material, the first end cap having inner flaps and outer flaps;
- stamping a second end cap from a very thin material, the second end cap having inner flaps and outer flaps;
- rolling a cylindrical metal sleeve from a flat rectangular sheet of metal;
- inwardly forming the inner flaps of the first end cap;
- inwardly forming the inner flaps of the second end cap;
- placing the inwardly formed inner flaps of the first end cap over the metal sleeve;
- placing the inwardly formed inner flaps of the second end cap over the metal sleeve;
- winding an excitation winding coil around the metal sleeve, first end cap inner flaps and second end cap inner flaps, where the excitation winding coil is contained by the first and second end caps;
- folding the first end cap outer flaps around the excitation winding coil; and
- folding the second end cap outer flaps around the excitation winding coil.

19. The method of claim 18 further comprising wrapping an inner ring of tape around an outside diameter of the first and second end cap inner flaps and metal sleeve.

20. The method of claim 18 further comprising wrapping an outer ring of tape around an outside diameter of the folded outer flaps of the first and second end cap outer flaps.

21. The method of claim 18 further comprising placing the bobbin assembly within a claw pole assembly having an integrated hub.

* * * * *